United States Patent Office

2,865,900
Patented Dec. 23, 1958

2,865,900
USE OF PHOSGENE TO IMPROVE RESIN YIELD

Stanley B. Mirviss, Roselle, and Charles F. Marsden, Jr., Bedminster, N. J., assignors to Esso Research and Engineering Company, a corporation of Delaware No Drawing. Application April 9, 1954
Serial No. 422,247

8 Claims. (Cl. 260—82)

This invention relates to a novel process for improving the quality of petroleum hydrocarbon polymers, and, more particularly, to a process in which petroleum polymers are improved by the addition of small amounts of phosgene, with or without styrene, to the reaction mixture under critical conditions.

Hydrocarbon polymers can be produced from certain petroleum refinery streams containing olefins and diolefins by such methods as polymerization using Friedel-Crafts catalysts. The steam cracked streams have been found especially useful for this purpose.

It has now been found, however, that if a small quantity of phosgene is added to the reaction mixture, improved polymer yields are obtained. The improvement is further enhanced by the addition of small amounts of styrene. The resin products are substantially soluble, that is, they contain substantially no insoluble gel.

Hydrocarbon polymers to which the present invention is applicable are made by treating a hydrocarbon mixture containing diolefins, olefins, aromatics, paraffins, and naphthenes with 0.25% to 3.5% based on the unsaturated hydrocarbon feed of an aluminum halide catalyst such as aluminum chloride and aluminum bromide. The catalysts may be used as solids or they may be employed as solutions, slurries or complexes. Hydrocarbon complexes of the catalysts, obtained by reaction of the aluminum halide with a resin raffinate for example one containing about 60% olefins and 40% aromatics, are also quite useful.

Typical hydrocarbon fractions useful for feeds in making these resins boil from 20° to 170° C. Analyses show the following composition:

Distillation range:

| Fraction, °C. | Wt. percent |
|---|---|
| 20–70 | 0–60 |
| 70–130 | 65–40 |
| 130–170 | 35–0 |

Composition:

| | |
|---|---|
| Diolefins | 8–20 |
| Aromatics | 19–49 |
| Olefins | 68–30 |
| Paraffins & Naphthenes | 5–1 |

The polymerization reactions are conducted at temperatures in the range of −30 to +75° C. and preferably from −15° to +60° C. Residual catalyst is quenched by suitable methods, such as addition of methyl alcohol and subsequent filtration, or by water and/or caustic washing. The final polymerizate is then stripped of unreacted hydrocarbons. If desired low molecular weight polymers can be stripped off by vacuum or steam distillation to yield high softening point resins. A hydrocarbon mixture suitable for resin production is conveniently found in selected hydrocarbon streams obtained by steam cracking gas oils. These cracked streams have boiling ranges between 20° and 170° C., or may be composed of any intermediate fraction selected from this range.

The invention consists of adding to the reaction mixture 0.2 to 5% of phosgene, based on total materials except catalyst, whereupon the polymer yields are increased beyond the amount of phosgene added. Even greater yields are obtaned if the phosgene is added to a partially polymerized mixture of feed and styrene. In any case, the same proportion of phosgene (0.2 to 5%) is added. Preferably, additional AlCl₃ is added after the phosgene addition.

The polymerization to prepare the polymers or resin is necessarily carried out in batch operation or in separate stages or continuously with the modifying phosgene being added after the first stage of polymerization. The reaction mixture containing the modifying phosgene and additional catalyst is agitated at the initial, or better at a somewhat higher reaction temperature, until the polymerization reaction is essentially complete. The higher reaction temperature is advantageous to resin yield.

The essential features of the invention are illustrated by the following examples although it is not intended to limit the invention thereto.

EXAMPLE I

A steam cracked distillate (Feed I), boiling largely in the range of 40 to 145° C. and containing about 16% diolefins, 24% aromatics, 58% olefins and 2% paraffins and naphthenes was polymerized with solid AlCl₃ or slurries of powdered AlCl₃ in n-hexane. In a series of runs AlCl₃ was employed as the catalyst and was added to the reactor over a ½ to ¾ hour period. The temperature was maintained at 20–25° C. during the time of catalyst addition as well as for an additional ⅓ to ¾ hour reaction period following the catalyst addition. The reaction mixtures were quenched with 5% H₂SO₄ solution (aqueous) and then water washed. Finally, the washed polymer solutions were stripped to remove unreacted components of the feed. In most cases the resulting polymers were stripped further to a resin temperature of 260–280° C. at 3–6 mm. Hg to recover hard resinous products.

In the above process, 1.2% phosgene was added after part of the aluminum chloride. The remainder of the aluminum chloride was then added. It is advantageous for polymer yield to then increase the reaction temperature to 45–55° C. for an additional ⅓–¾ hour reaction period. The results are shown in Table I.

Table I

| Feed | Wt. Percent on Feed | | Percent Increase in Polymer Yield Based on Amount of Added Phosgene | Resin Product | | |
|---|---|---|---|---|---|---|
| | AlCl₃ | Polymer Yield | | Wt. Percent Yield | Soft. Pt., °C. | Color |
| Steam-cracked Distillate, Feed I(a) | 1.0 | 39 | | 35 | 90 | 3 |
| Do | 2.8 | 45.8 | | 37.8 | 90 | 7.5 |
| Steam-cracked Distillate, Feed I(b) | 2.8 | 46.1 | | 36.6 | 90 | 7 |
| 98.8 wt. percent Feed I+1.2% Phosgene (a,c) | 1.0+1.8 | 46.7 | 117 | 38.0 | 90 | 6.5 |
| 98.8 wt. percent Feed I+1.2% Phosgene (b,c) | 1.0+1.8 | 51.5 | 500 | 39.9 | 90 | 7 | a Polymerizations run at 20–25°C.
b Initial polymerization at 20–25° C., temperature raised to 45–50° C. after final catalyst addition.
c Phosgene added to reactor after the addition of 1.0% AlCl₃ and was followed by the addition of 1.8% AlCl₃.

These data show the advantage of adding the phosgene; namely, that increased yields of polymer and completely soluble and high softening point resin products are obtained. The effect on product yield is pronounced at the 50° C. reaction temperature.

EXAMPLE II

In another series of runs a steam cracked distillate (Feed II) was employed which contained about 19 wt. percent $C_5$, 22% $C_6$, 40% $C_7$ and 19% $C_8$ and $C_9$ components. The total stream contained 18 wt. percent conjugated diolefins, 53.5% olefins, 26.5% aromatics and 2% paraffins and naphthenes. This steam cracked distillate was copolymerized with various amounts of styrene at 20° C. with stirring using 1% of aluminum chloride and 0.8 to 1.6% phosgene was added to the polymerizate followed by additional aluminum chloride at 20° C. The temperature was slowly raised to 50° C. and the reaction mixture stirred at this temperature for one hour. The amount of additional aluminum chloride added was sufficient to maintain a catalytic excess over a 1:1 mole ratio with the phosgene. The results are reported in Table II.

Table II

| Feed | Polymerization Temp., °C. | Wt. Percent on Feed | | Percent Increase in Polymer Yield Based on Amount of Added Phosgene | Resin Product | | |
|---|---|---|---|---|---|---|---|
| | | AlCl₃ | Polymer | | Yeild Wt. Percent on Feed | Soft. Pt., °C. | Color |
| Stm. Cracked Feed I a | 50 | 2.8 | 46.1 | | 36.6 | 90 | 7 |
| 95% Feed I+5% Styrene | 50 | 2.8 | 54.3 | | 43.9 | 83 | 5.5 |
| 93.9% Feed I+4.9% Styrene+1.2%Phosgene | b20-50 | c2.8 | 63.7 | 840 | 47.5 | 83 | 6 |
| 90% Feed II+10% Styrene | 50 | 2.0 | 49.2 | | 41.4 | 78 | 4 |
| 89.3% Feed II+9.9% Styrene+0.8% Phosgene | b20-50 | c2.2 | 61.2 | 1,500 | 48.5 | 82 | 5 |
| 90% Feed II+10% Styrene | 50-55 | 3.0 | 51.6 | | 43.4 | 84 | 6 |
| 88.6% Feed II+9.8% Styrene+1.6% Phosgene | 20-50 | 3.4 | 63.8 | 825 | 50.6 | 84 | 5 | a Described in Example I.
b Initial reaction temperature of 20° C. raised to 50° C. after the addition of phosgene.
c 1% AlCl₃ added during first 15-45 min. of reaction. Remainder of AlCl₃ added after phosgene addition.

These data further show that styrene and phosgene can be employed to improve substantially the polymer and resin yields without encountering insoluble polymer formation. The best results were obtained with the smaller amount of phosgene and greater amount of styrene.

The nature of the present invention having been thus fully set forth and specific examples of the same given, what is claimed as new and useful and desired to be secured by Letters Patent is:

1. A process for improving the yield of an unsaturated hydrocarbon polymer prepared by maintaining a polymerization feed comprising a steam-cracked petroleum fraction boiling within the range of 20° to 170° C. in the presence of an aluminum halide catalyst at temperatures in the range of −30° to +75° C., which comprises treating a solution of partially polymerized feed with about 0.5 to 5% by weight of phosgene, based on the total amount of said polymerization feed, and completing polymerization of the unreacted feed in the presence of said phosgene.

2. A process according to that of claim 1 in which 5 to 10% styrene is included in the reaction mixture.

3. A process for preparing an unsaturated hydrocarbon polymer in increased yield which comprises partially copolymerizing a steam-cracked petroleum distillate boiling in the range of about 20 to 170° C. in the presence of about 1% aluminum chloride with 5 to 10% styrene at a temperature of 20° C., and then adding 0.5 to 5% phosgene, based on the polymerization feed to the resulting polymer mixture and sufficient additional aluminum chloride to maintain a catalytic excess over a 1:1 mole ratio with the phosgene, and maintaining the reaction mixture at 50° C. for about an hour to substantially complete copolymerization.

4. In a process for raising the yield of an unsaturated hydrocarbon polymer obtained by polymerizing a steam cracked petroleum distillate boiling in the range of about 20° to 170° C. in the presence of 0.25 to 3.5% of an aluminum halide catalyst at a temperature of −30° to +75° C., the improvement which comprises adding from 0.5 to 5%, based on the total amount of polymerization feed, of phosgene to said distillate prior to completion of the polymerization.

5. Process according to claim 4 in which the polymer is stripped at 260–280° C. at 3–6 mm. Hg to give a high melting point resin.

6. A process for raising the yield of an unsaturated hydrocarbon polymer which comprises partially polymerizing a steam cracked petroleum distillate boiling in the range of about 20° to 170° C. in the presence of 0.25 to 3.5% of an aluminum chloride catalyst at a temperature of −15 to +60° C., adding from 0.5 to 5% phosgene and 5 to 10% styrene, based on the total amount of polymerization feed, to the resulting partially polymerized reaction mixture, and completing the polymerization of said distillate in the presence of the added phosgene and styrene.

7. Process according to claim 6 in which the polymer is stripped at 260–280° C. at 3–6 mm. Hg to give a high melting point resin.

8. A process for producing a petroleum hydrocarbon resin which comprises partially polymerizing in the presence of an aluminum halide catalyst at a polymerization temperature of about 20° to 25° C. a steam-cracked petroleum distillate boiling between about 20°–170° C., adding thereto about 0.5–5.0% phosgene and not over 10% styrene based on the polymerization feed, adding thereto additional aluminum halide catalyst, and completing the polymerization of the resulting reaction mixture at a temperature between about 45° and 55° C.

References Cited in the file of this patent

UNITED STATES PATENTS 1,836,629   Thomas et al. _____ Dec. 15, 1931

OTHER REFERENCES

Thomas: "Anhydrous AlCl₃ In Organic Chemistry," pages 763–764, Reinhold (1941).